United States Patent Office 2,864,855
Patented Dec. 16, 1958

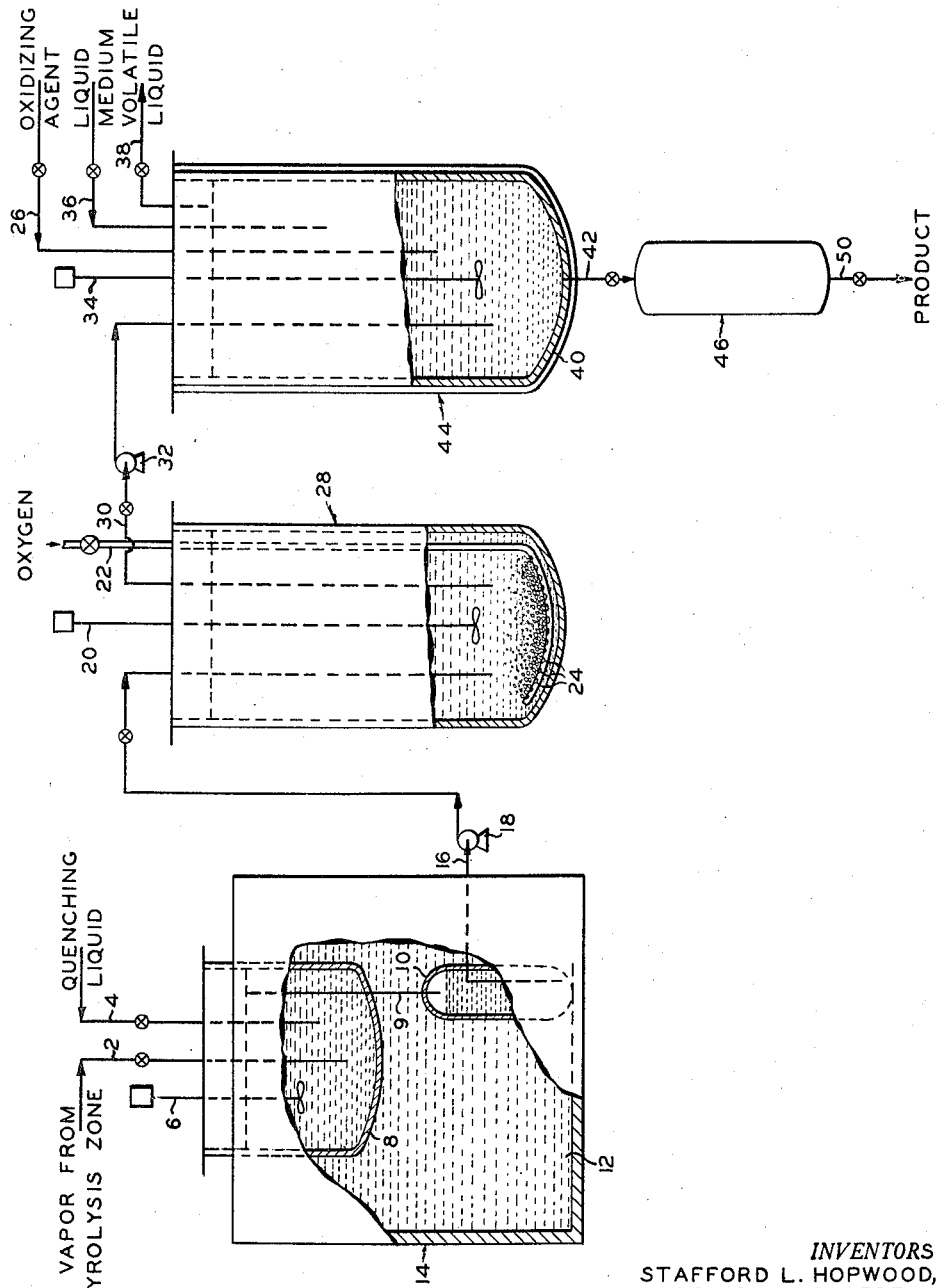

2,864,855

AROMATIC CARBOXYLIC ACIDS AND DERIVATIVES AND PREPARATION THEREOF FROM PEROXIDE POLYMERS

Stafford L. Hopwood, Jr., Cedar Grove, and Louis A. Errede, Westfield, N. J., assignors, by mesne assignments, to Minnesota Mining and Manufacturing Company, St. Paul, Minn., a corporation of Delaware Application August 24, 1955, Serial No. 530,362

20 Claims. (Cl. 260—475)

This invention relates to a novel and improved process for the production of aromatic carboxylic acids and their derivatives. In one aspect, this invention relates to a novel and improved process for the production of aromatic dicarboxylic acids. In another aspect, this invention relates to a novel and improved process for the production of derivatives of aromatic dicarboxylic acids. In a more particular aspect, this invention relates to a novel and improved process for the production of terephthalic acid and methyl terephthalate.

A valuable class of organic compounds is the aromatic carboxylic acids and derivatives thereof. Such acids and ester derivatives, for example, and especially the aromatic dicarboxylic acids and their esters are particularly useful as chemical intermediates in the production of synthetic fibers. For example, terephthalic acid and methyl terephthalate are valuable intermediates for the production of polyester synthetic fibers commercially known as Dacron and Terylene. The sudden urgent need for terephthalic acid and its methyl ester as raw materials for synthetic textile fibers has made this acid and ester, in particular, of outstanding importance and has made a commercially feasible process for their production of prime importance.

Terephthalic acid is presently produced by the air oxidation of p-xylene, which process leads to the desired acid in only fair yield and selectivity. Its ester derivatives are prepared in a separate step involving esterification of the free acid. Other aromatic acids and derivatives and especially those in which the carboxy groups are bonded to nuclear carbon atoms which are in the 1 and 4 position to each other are similarly difficult to prepare by a direct process in good yield and with good selectivity of the starting material to desired product.

It is an object of the present invention to provide a novel and improved process for the preparation of aromatic carboxylic acids and derivatives thereof.

Another object is to provide a novel and improved process for the production of aromatic dicarboxylic acids which process has many advantages which render it a commercially attractive process.

Another object is to provide a direct process for the production of ester derivatives of aromatic dicarboxylic acids which process is commercially feasible, economical and leads to the formation of desired product in excellent yield and selectivity with the minimum number of chemical and mechanical steps for isolation and purification of the product.

Another object is to provide a novel and improved method for the production of aromatic dicarboxylic acids and derivatives in which the carboxy groups are substituted on nuclear carbon atoms which are in the 1 and 4 position to each other.

Another object is to provide an improved process for the manufacture of terephthalic acid, which process is commercially feasible and economical.

Another object is to provide a direct method for the manufacture of terephthalic acid in high yield and selectivity.

A further object is to provide an improved process for the manufacture of terephthalic acid with the minimum formation of by-products and with the maximum utilization of the starting material.

A further object is to provide a novel direct process for the production of methyl terephthalate in high yield.

Various other objects and advantages of the present invention will become apparent to those skilled in the art from the accompanying description and disclosure.

Accordingly these objects are accomplished by the novel process which comprises oxidation of a peroxide polymer having a recurring aromatic nucleus and a recurring peroxide linkage to produce an aromatic carboxylic acid. The oxidation process of the present invention is carried out in the presence of an oxygen-containing oxidizing agent including free oxygen and both organic and inorganic oxygen-containing compounds. When the process of the present invention is carried out in the presence of suitable compounds such as metal hydroxides, hydroxy-containing organic compounds and ammonia, the corresponding derivatives of aromatic carboxylic acids, that is, the metal salts, esters and amides, are formed directly. Generally speaking, the process of the present invention is carried out at a temperature between about 30° C. and about 250° C. at atmospheric, autogenous, reduced or superimposed pressure. The novel process herein described leads to the production of aromatic carboxylic acids and their derivatives in high yield with good selectivity.

This invention is a continuation-in-part of copending application Serial No. 505,904, filed in the names of L. A. Errede and S. L. Hopwood, Jr., on May 4, 1955.

The starting material which is oxidized by the process of the present invention is a peroxide polymer having a recurring aromatically unsaturated nucleus bonded to a peroxide group through the carbon atom of a methylene group. The general nature of the starting material is represented by the following scheme:

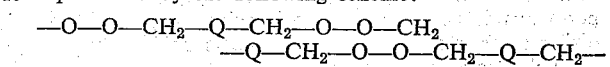

wherein Q is an aromatically unsaturated cyclic nucleus containing at least one six-membered ring having aromatic unsaturation and is bonded to nuclear carbon atoms which preferably are in the 1 and 4 position to each other. In other words the peroxide polymer which is oxidized by the process of the present invention contains the successively recurring unit, —O—CH$_2$—Q—CH$_2$—O—, wherein Q is as above-defined. The Q radical is preferably selected from the group consisting of a benzene nucleus, a naphthalene nucleus, and an aromatically unsaturated heterocyclic nucleus containing at least one heteronitrogen atom, the nitrogen atom or atoms being vicinal only to nuclear carbon atoms. The nuclear substitution of Q is selected from at least one of the group consisting of normally gaseous halogens, hydrogen and methyl radicals. The preferred peroxide polymer starting material of the present invention is that containing the successively recurring unit,

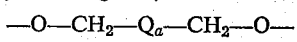

or the successively recurring unit,

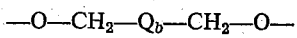

wherein $Q_a$ and $Q_b$ is a benzene nucleus bonded at nuclear carbon atoms which are in the 1 and 4 position to each other and wherein $Q_a$ contains from 0 to 2 methyl nuclear substituents and wherein $Q_b$ contains from 0 to 2 normally gaseous halogen atoms.

The starting material which is employed to produce the valuable aromatic acid, terephthalic acid, and its derivatives, is poly-p-xylylene peroxide wherein Q of the above scheme is a benzene nucleus bonded to the methylene groups at para-positioned nuclear carbon atoms, or in other words, poly-p-xylylene peroxide has the successively recurring unit

The process of the present invention is a particularly excellent process for the preparation of terephthalic acid and dimethyl terephthalate. It leads to the production of terephthalic acid and its dimethyl ester in excellent yields and is a commercially feasible and attractive process for the production of this acid inasmuch as it employs readily available starting materials, consumes the maximum amount of starting material with the minimum formation of by-products, and is an easily controlled process.

The oxidizing agents which may be employed to oxidize the peroxide polymer starting material in accordance with the process of the present invention are preferably the strong oxidizing agents including uncombined or free oxygen, that is, oxygen in the form of pure molecular oxygen, air, or ozone; strong oxidizing acids; metal salt derivatives of strong oxidizing acids; hydrogen peroxide; metal oxides; and organic salts of variable valence metals; and any mixture thereof. Weak oxidizing agents such as nitrobenzene and nitromethane may also be employed but, generally speaking, they are more effective in the presently described process when they are employed in conjunction with one of the stronger oxidizing agents. The oxidizing agent is used in a concentration which varies over relatively wide limits. For example, the oxidizing agent is generally employed in a ratio of oxidation equivalents to moles of oxygen-containing monomer units, that is, of —O—CH$_2$—Q—CH$_2$—O— units, ranging between about 2:1 and about 50:1, and preferably ranging between about 6:7 and about 15:1.

The strong oxidizing acids which may be used include the strong inorganic oxidizing acids such as nitric acid and chromic acids; inorganic oxygen and halogen-containing acids such as iodic acid, hypochlorous acid and hypobromous acid; inorganic peracids such as periodic acid, permanganic acid and perchloric acid; and organic oxidizing acids such as perfluoroperacetic acid. The salts of such strong oxidizing acids may also be used as the oxidizing agent and are, for example, sodium chromate, potassium dichromate, sodium hypochlorite, potassium permanganate, sodium iodate and sodium periodate. The acids may be added as such to the reaction medium or they may be formed in situ. For example, chromic acid is generated in situ under the reaction conditions described herein by adding sodium chromate and an acid such as sulfuric acid, to the reaction mixture.

As above-mentioned hydrogen peroxide may also be used as the oxidizing agent, and is one of the preferred oxidizing agents inasmuch as it leads to the production of the aromatic dicarboxylic acids in almost quantitative yields and is an especially excellent oxidizing agent when it is desired to carry out the oxidation reaction in the presence of an alcohol or ammonia leading to the direct production of the ester or amide derivatives of the aromatic carboxylic acids. The hydrogen peroxide may be added to the reaction mixture as such and preferably it is added in the form of an aqueous solution. The hydrogen peroxide also may be formed in situ. For example, when a metal peroxide such as sodium peroxide, barium peroxide, or zinc peroxide and a mineral acid such as sulfuric acid are charged to the reaction mixture, hydrogen peroxide is generated in situ.

Other suitable inorganic oxidizing agents include selenium oxide and other metal oxides such as the oxides of the variable valence metals exemplified by oxides of vanadium, chromium, manganese, nickel, iron, and cobalt, and metal peroxides such as sodium peroxide, barium peroxide, zinc peroxide and lead peroxide. Such metal oxides are preferably employed, however, in conjunction with another oxidizing agent such as molecular oxygen.

Additional organic oxidizing agents comprise the organic salts of a variable valence metal, the metal being in one of its higher valence states, and are, for example, mercuric acetate, lead tetraacetate, lead tetrapropionate and the like.

The oxidation process of the present invention may be carried out in the presence or absence of a promoter or catalyst. Suitable catalysts which may be employed comprise organic amines and organic salts of manganese and cobalt. Typical examples of suitable amines which may be employed are N-methyl aniline, tertiary-butyl amine, N,N-dimethyl aniline, pyridine and tertiary-ethyl amine. Of these, tertiary amines are preferred. Typical examples of suitable organic salts of manganese and cobalt which may be used as catalysts are manganese and cobalt naphthenate. This latter type catalyst may be used with or without the addition of the corresponding free metal such as elemental cobalt or manganese. As above-mentioned, the metal oxides such as vanadium oxide are preferably employed as promoters in conjunction with another type of oxidizing agent. When a catalyst or a promoter is used in the process of the present invention, it is used in a weight ratio of catalyst to peroxide polymer of between about 0.001:1 and about 1:1. Usually less than about 0.1 weight percent of the catalyst or promoter is required.

The oxidation of the peroxide polymer is effected in a liquid medium in which the particular oxidizing agent is at least partially soluble and which is substantially inert to the oxidizing agent employed under the particular reaction conditions. Typical examples of suitable liquids which undergo the minimum amount of oxidation and which may be used as the reaction medium comprise water, acetic acid and acetone. Other liquids which may be employed under certain reaction conditions are methyl ethyl ketone, dioxane, hexane, cyclohexane, benzene and peracetic acid. The weight ratio of liquid to peroxide polymer may vary over relatively wide limits such as between about 1.5:1 and about 100:1, but usually the weight ratio of liquid to peroxide polymer is between about 6:1 and about 25:1. The oxidation of the peroxide polymer is preferably conducted in an aqueous medium which may be acidic, neutral or basic.

The preferred pH of the system in any particular reaction depends to a large extent upon the type of oxidizing agent employed and the desired product. For example, when air or pure molecular oxygen is employed, best results are obtained when the oxidation is effected under alkaline conditions at a preferred pH between about 8 and about 12. Essentially no aromatic dicarboxylic acid is formed when the peroxide polymer is oxidized in the presence of free oxygen in a neutral medium. When oxidizing agents such as hydrogen peroxide, sodium iodate, sodium periodate, and potassium perchlorate are employed best results are usually obtained when the reaction is carried out under acidic conditions, that is at a pH of 6 or below.

The particular pH which is desired is obtained by the addition of appropriate compounds which will render the reaction medium either basic or acidic. For example, when it is desired to carry out the reaction under alkaline conditions, basic materials comprising metal cyanides, hydroxides, carbonates, and alcoholates are used. Typical examples of such basic materials are sodium cyanide, sodium hydroxide, potassium hydroxide, sodium carbonate, potassium carbonate, sodium bicarbonate, sodium ethylate, potassium butyrate or any other such compound which is soluble in the liquid medium employed. When such salts are employed, the corresponding metal salt of the aromatic carboxylic acid is usually formed and may be isolated as the product of the process as desired. Alternatively, upon the completion of the reaction in an alkaline medium, the reaction mixture may be acidified with a mineral acid such as hydrochloric acid, in order to hydrolyze the metal salt of the acid to the free acid which is then recovered as the product of the process. For example, when an aqueous suspension of poly-p-xylylene peroxide containing potassium hydroxide is oxidized by the process of the present invention, potassium terephthalate is formed which upon acidification yields terephthalic acid as the product of the process.

Suitable acidic materials which may be employed to carry out the oxidation reaction of the present invention under acidic conditions, that is, at a pH of 6 or below, are the mineral acids such as sulfuric acid, hydrochloric acid and phosphoric acid; organic acids such as toluene sulfonic acid, benzene sulfonic acid and methyl sulfuric acids; acid sulfates such as sodium acid sulfate, and potassium acid sulfate; and inorganic salts derived from a weak base and a strong acid such as ferric chloride and calcium chloride.

When the above-mentioned acids and basic materials are employed in the process of the present invention, they are generally used in an amount between about 0.01 and about 10 weight percent based on the weight of liquid medium employed, or a sufficient quantity to obtain the desired pH of reaction. Buffers also may be added to the reaction mixture to maintain the appropriate pH conditions and are typically exemplified by sodium metaborate and disodium hydrogen phosphate.

The temperature, pressure, and reaction time employed in the presently described process may vary over relatively wide limits without departing from the scope of this invention. The temperature employed is generally between about 30° C. and about 250° C. and is preferably between about 50° C. and about 150° C. Low temperatures such as 30° C. are usually employed only when the above-mentioned catalysts or promoters are added to the reaction mixture.

Although the oxidation reaction may be effected at reduced and superimposed pressures, it is usually desirable and convenient to carry out the reaction at atmospheric pressure in an open reaction vessel or under autogenous conditions of pressure in a sealed reaction vessel. Sub-atmospheric pressures are employed when it is desirable to reflux the reaction mixture at temperatures which are below the atmospheric boiling point of the liquid medium. Superimposed pressures up to 200 atmospheres are attained by charging an inert gas such as nitrogen to the reaction vessel, and are employed when it is desirable to operate at a reaction temperature which is above the atmospheric boiling point of the liquid medium or to maintain a relatively high concentration of oxygen in the reaction mixture when oxygen is used as the oxidizing agent.

In general the reaction time will depend upon the particular temperature and pressure which are employed to effect the oxidation of the peroxide polymer starting material. The aromatic acid or its derivatives begins to form immediately when the peroxide polymer is treated by the presently described invention. Generally speaking, the reaction runs to completion within a time ranging between about one-half and about 5 days, and more often between about 2 hours and about 100 hours. The reactions which are run at the lower temperatures at atmospheric pressure in the absence of the above-mentioned catalysts or promoters usually require the longer reaction time for completion of the reaction.

When the oxidation of the peroxide polymer is carried out under the above-discussed conditions in the presence of an alcohol, an ester derivative of the aromatic carboxylic acid is formed directly and is recovered as the product of the process. In order to obtain the maximum yield of ester derivative, the reaction is preferably carried out under acidic conditions, that is, at a pH of 6 or below by employing any of the above-mentioned acid materials such as toluene sulfonic acid, to obtain appropriate pH conditions. The alcohols which may be employed when it is desired to form an ester of the aromatic carboxylic acid include the substituted and unsubstituted aliphatic alcohols containing between about 1 and 20 carbon atoms per molecule and aromatic alcohols. Such alcohols may be substituted, for example, with atoms of halogen and nitrogen. Suitable aliphatic alcohols, including both monohydroxy and polyhydroxy alcohols which may be employed are those of the homologous series methyl, ethyl, propyl . . . eicosyl alcohols, dichlorohydrin, ethylene glycol, glycerol, pentamethylene glycol, erythritol and triethanolamine. Suitable aromatic alcohols are typically exemplified by benzyl and phenylethyl alcohols, and alkyl phenoxy ethanols.

One preferred method for obtaining the ester derivatives directly from the peroxide polymer in a one step procedure comprises reaction of the peroxide polymer with an oxidizing agent in the presence of an acidified aqueous solution containing one of the above-mentioned alcohols. Irradiation of this reaction mixture with actinic or ultraviolet light hastens free radical oxidation directly to the ester. For example, when poly-p-xylylene peroxide is suspended in methanol and dilute sulfuric acid and irradiated with ultraviolet light while bubbling oxygen through the reaction mixture, methyl terephthalate is produced in good yield with excellent conversion of starting material to product.

A particularly preferred procedure for obtaining the esters of the aromatic dicarboxylic acids in high yield with excellent selectivity comprises reaction of the peroxide polymer with hydrogen peroxide at a pH which is preferably 6 or below in the presence of one of the above-mentioned alcohols.

The weight ratio of the alcohol to peroxide polymer which is employed varies over relatively wide limits such as between about 100:1 and 1:1, and preferably between about 75:1 and about 25:1. This embodiment of the present invention leads to the direct production of esters of terephthalic acid, in particular, in very high yield with excellent selectivity of the starting material, that is, poly-p-xylylene peroxide, to desired ester.

When the oxidation of the peroxide polymer is carried out in the presence of excess ammonia or ammonium hydroxide the amido or ammonium salt derivatives of the aromatic carboxylic acids are formed directly. For example, when poly-p-xylylene peroxide is reacted with ammonia while bubbling oxygen through the reaction mixture, terephthalamide is produced directly in good yield.

The above-defined peroxide polymer which is employed as the starting material in the process described herein is prepared by a copolymerization reaction between a quinodimethane and oxygen. The quinodimethane monomer which is copolymerized with oxygen to produce the peroxide polymer employed as the starting material in the process of the present invention is that containing a di-unsaturated six-membered ring to which two methylene groups are doubly bonded. The two methylene groups which are doubly bonded to the di-unsaturated six-membered ring are bonded to nuclear carbon atoms of the ring which are preferably in the 1 and 4 position, or para position, to each other as, for example, in p-quinodimethane,

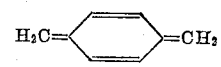

The quinodimethane containing more than the one di-unsaturated quinoid type of ring is preferably that in which the additional ring is a six-membered ring having aromatic unsaturation of the benzenoid type and which is fused to the quinoid ring as in 1,4-naphthaquinodimethane. Suitable quinodimethanes which may be used to produce the starting material of the present invention include p-quinodimethane, p-naphthaquinodimethane, and the heterocyclic analogues of such quinodimethanes having at least one nitrogen atom as part of the cyclic nucleus, said nitrogen atom or atoms being vicinal only to nuclear carbon atoms, as for example, in 2,5-quinopyrimidinyldimethane.

Such quinodimethanes are produced by pyrolyzing aromatically unsaturated compounds having at least one six-membered aromatically unsaturated cyclic nucleus having methyl groups bonded to nuclear carbon atoms which are in the 1 and 4 position to each other, said aromatically unsaturated compounds having additional nuclear substitution selected from at least one of the group consisting of the normally gaseous halogens, hydrogen and methyl radicals. The pyrolysis of such 1,4-dimethyl aromatic compounds is carried out at a temperature between about 700° C. and about 1300° C. and at a total pressure not higher than about 400 mm. mercury for a period of not more than one second followed by quenching of the pyrolyzed vapor to produce a quinodimethane.

The hot vapors of the pyrolyzed 1,4-dimethyl substituted aromatically unsaturated compounds are quenched quickly to a temperature which is preferably below about −45° C. by passing the vapors into an inert liquid having a low freezing point such as hexane, toluene, acetone, diethyl ether, methanol or any other liquid compound or mixtures having a freezing point below the temperature at which quenching is effected. A more detailed description concerning the preparation of the quinodimethanes can be found in copending application Serial Number 386,106 filed in the names of L. A. Errede and B. F. Landrum on October 14, 1953, now U. S. Patent 2,777,005.

As above-mentioned the peroxide polymer which is oxidized by the process of the present invitation to yield aromatic carboxylic acids is prepared by copolymerizing the above-described quinodimethanes with oxygen. The conditions of copolymerization are controlled so that a high concentration of oxygen, that is between about 0.1 mol and about 10 mols of oxygen per mol of quinodimethane monomer is brought into contact with the quinodimethane. This is accomplished by conducting the copolymerization in a solvent in which oxygen is relatively soluble and/or by maintaining the ratio of the volume of the solution-oxygen interphase to solution phase at a maximum and by conducting the copolymerization at a temperature which is preferably between about −45° C. and about −80° C., which temperature may be as low as −120° C. Polar solvents such as acetone, methyl ethyl ketone, methyl isobutyl ketone, ethyl acetate, methanol, ethanol and diethyl ether are preferred as the medium in which copolymerization of the quinodimethane and oxygen is effected inasmuch as oxygen is more soluble in such solvents. The ratio of solution-oxygen interphase to solution phase is kept at a maximum by maintaining vigorous agitation of the reaction mixture during copolymerization, and/or by either spraying a solution of the monomer as a mist into a chamber filled with oxygen or by passing a large volume of oxygen through a multitude of tiny orifices at the bottom of the cold solution of the monomer. A large throughput of air or oxygen is introduced into the cold monomer solution, or enough oxygen or air to convert the solution to an aerified bed of tiny air or oxygen bubbles. To accomplish this, the air or oxygen is introduced at a rate which, in general, is between about 0.01 cubic foot per minute and about 1.0 cubic foot per minute. The overall time of the copolymerization reaction may vary over relatively wide limits such as between about 10 minutes and about 30 hours, but, in general, the copolymerization reaction is carried out for a reaction time ranging between about one-half hour and about 10 hours. Upon completion of the reaction, the peroxide polymer is collected as a white powder.

The peroxide polymer produced by copolymerizing the quinodimethane with oxygen under the conditions above-described and which is oxidized by the process of the present invention to produce aromatic acids is that having the recurring aromatically unsaturated cyclic nucleus, Q, two nuclear carbon atoms of which each are singly bonded to a methylene group, namely a $—CH_2—$ group; and a recurring peroxide linkage, namely $—O—O—$, which peroxide linkage is bonded to $—Q—$ through the carbon atom of the methylene group. Such a peroxide polymer contains the successively recurring unit $$—O—CH_2—Q—CH_2—O—$$

and may also contain the successively recurring unit, $—CH_2—Q—CH_2—$, wherein Q in both recurring units is as previously described.

The starting material of the present invention, that is, the peroxide polymer, is that in which the recurring unit $—O—CH_2—Q—CH_2—O—$ comprises between about 10 percent and almost 100 percent of the total monomer units in the polymer and in which the recurring unit, $—CH_2—Q—CH_2—$, comprises between 0 percent and about 90 percent of the total monomer units in the polymer. The total number of monomer units in the peroxide polymer may be as high as 500 but generally the total number of monomer units ranges between about 100 and about 250.

The accompanying drawing is presented as a better understanding of the present invention. It represents a diagrammatical elevational view, partly in cross-section, of an arrangement of suitable apparatus for carrying out the oxidation process of the present invention including the preparation of the peroxide polymer starting material.

The apparatus as shown comprises a quenching assembly 14, a copolymerization chamber 28, and an oxidation chamber 44. Although the following discussion of the use of this apparatus is directed towards the oxidation of poly-p-xylylene peroxide to yield terephthalic acid and its derivatives, it is to be understood that the same discussion applies in general to the oxidation of the other peroxide polymers described herein.

Referring to the accompanying drawing, the quenching assembly 14 comprises a quenching vessel 8 fitted with spill-over 10 having the conduit 9 attached thereon, and a low temperature bath 12 which surrounds both the quenching vessel 8 and spill-over 10. The low temperature bath is maintained at a temperature below −45° C. and, in general, it consists of a solid carbon dioxide-acetone mixture. The quenching vessel 8 is further fitted with an agitator 6, an inlet 4 by means of which the quenching liquid such as acetone is introduced into the quenching vessel, and inlet 2 by means of which p-quinodimethane vapor is introduced into the quenching vessel, and a vacuum line which is not shown. The purpose of conduit 9 and spill-over 10 is to maintain the level of liquid in the quenching vessel at a constant level.

The hot vapors of p-quinodimethane are transferred to the quenching vessel 8 by means of conduit 2 as soon as they are formed in the pyrolysis zone which is not shown in the drawing. The hot vapors of p-quinodimethane are rapidly quenched in acetone, for example, contained in the quenching vessel 8, the quenching of vapor being carried out at subatmospheric pressure as described herein and preferably at a temperature of −45° C. or below. The level of the solution in the quenching vessel 8 may be kept at a sufficiently high level so that the solution of p-quinodimethane overflows continuously into the spill-over 10 by means of conduit 9. The rate of discharge of solution from the quenching vessel 8 into the spill-over 10 is regulated by the rate at which the quenching liquid is introduced into the quenching vessel by means of the conduit 4. The cold solution of p-quinodimethane monomer as it flows through conduit 9 into spill-over 10 is transferred from the spill-over into the copolymerization chamber 28 by means of conduit 16 having the gear pump 18 attached thereon.

The copolymerization of p-quinodimethane and oxygen in the copolymerization chamber 28 is preferably carried out at atmospheric pressure. The copolymerization chamber 28 is fitted with a vent which is not shown, a suitable means of agitation 20, and an inlet 22 by means of which oxygen or air is introduced into the solution of p-quinodimethane. The oxygen or air which is introduced through inlet 22 passes through a multitude of tiny openings 24 at the end of the inlet 22. The cold solution of p-quinodimethane as it is pumped into the copolymerization vessel 28 comes into contact with oxygen immediately and the solution is allowed to gradually warm up to room temperature (25° C.) while maintaining a high concentration of oxygen throughout the copolymerization reaction. Reaction zone 28 may be surrounded by a low temperature bath if desired but, in general, this is not necessary.

When the copolymerization is complete, the suspension of poly-p-xylylene peroxide is pumped from zone 28 into the oxidation chamber 44 by means of conduit 30 having the gear pump 32 attached thereon. The oxidation chamber 44 is fitted with agitator 34; a heating jacket 40 which may be electrically heated or may be heated by steam or superheated steam, and is preferably maintained at a temperature between about 50° C. and about 150° C.; an inlet 26 by means of which the oxidizing agent, promoter, alcohol, ammonia, catalyst, base, acid or other such ingredients are introduced; an inlet 36 through which the liquid medium is introduced, and an outlet 38 by means of which a more volatile liquid carried over from the quenching or copolymerization zones may be discharged. The inlet 26 may be similar to the inlet 22 when oxygen is used as the oxidizing agent. The oxidation chamber 44 is preferably a pressure vessel in which sufficient pressure may be built in order to maintain the liquid medium in the liquid phase at the temperature of reaction which is desired.

Upon completion of the oxidation reaction the product is discharged from vessel 44 into the separation chamber 46 by means of conduit 42. Various procedures are carried out in the separation chamber such as filtration, acidification, washing and drying. The essentially pure and desired product is then discharged from the separation vessel 46 by means of conduit 50.

The process may be carried out with a continuous transfer of media from one reaction vessel to another or in a batchwise manner by the proper use of the indicated valves which use is understood to those skilled in the art.

The following examples are offered as a better understanding of the present invention and are not to be considered as unnecessarily limiting thereto.

EXAMPLE 1

This example illustrates the preparation of the peroxide polymer starting material which is oxidized by the process of the present invention.

(A) Preparation of the quinodimethane monomer

P-xylene vapor at 5 mm. mercury pressure and preheated to 700° C. was led through a pyrolysis tube of 2.5 cm. diameter and 30 cm. in length at such a velocity that the average contact time was 0.05 second and heated to a pyrolysis temperature of 1000° C. The pyrolyzed vapors were passed directly to the top of a six liter, 3 necked flask containing 3.8 liters of a chloroform-carbon tetrachloride mixture (1:1 by volume) which was cooled in a bath of solid carbon dioxide-acetone to a temperature of −80° C. The chloroform-carbon tetrachloride mixture was continuously agitated to prevent localized heating. The liquid remained transparent for about two hours until the saturation limit was reached and then became opaque as solid p-xylene and solid p-quinodimethane precipitated out. The flask was disconnected from the train at the end of the run and the solid precipitate containing p-xylene was removed by filtration.

To prove that the mother liquor contained p-quinodimethane, a portion of it was added at −80° C. to a solution of chloroform-carbon tetrachloride containing an excess of iodine. The mixture was allowed to warm to room temperature with occasional shaking but did not change in appearance. The excess iodine was neutralized with aqueous sodium thiosulfate and the organic liquid was washed with water to remove all traces of inorganic solids. The chloroform and carbon tetrachloride were removed under vacuum and the dry residue was recrystallized from methanol to give a light brown crystalline compound having a melting point of 176°–177° C. and 70.9 percent iodine. This corresponds to the reported melting point for 1,4-di-iodomethylbenzene, namely, 177°–178° C.

P-quinodimethane is similarly prepared in acetone, hexane, toluene and any other suitable liquid of low freezing point.

Other quinodimethanes such as 2-methyl-p-quinodimethane, 2,3 - dimethyl-p-quinodimethane, 2 - chloro-p-quinodimethane, 2-fluoro-p-naphthaquinodimethane, and 3-methyl-2,5-quinopyridyldimethane are similarly prepared under the above-described reaction conditions by the pyrolysis of pseudomumene, isodurene, 2-chloro-p-xylene, 2-fluoro-p-xylene, and 2,3,5-trimethyl pyridine, respectively.

(B) Copolymerization of the quinodimethane monomer and oxygen

In a two-liter Erlenmyer flask a solution of p-quinodimethane in acetone at −80° C. was gradually warmed to 0° C. while oxygen was bubbled through the solution at a rate of 0.5 cubic foot per minute with stirring at a rate of 250 R. P. M. The reaction was completed within an hour after which time the reaction mixture was warmed to room temperature (25° C.). The product thus formed was separated from the acetone by filtration and the filter cake washed with acetone and air dried. A quantitative yield of product, based upon the amount of p-quinodimethane available at the time the oxygen was introduced, was obtained. The product was analyzed and found to contain 70.5 percent carbon, 5.73 percent hydrogen and 23.8 percent oxygen corresponding to a ratio of

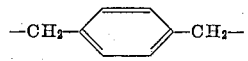

to combined oxygen, as —O—O—, of 1:1. Infrared analysis of the product showed it to contain the peroxide linkage —O—O—, phenyl groups, and singly bonded methylene groups. It was therefore shown that the product obtained consisted essentially of the recurring unit,

Other peroxide polymers which are prepared under similar reaction conditions as above described and which are oxidized by the process of the present invention are those having the following successively recurring units:

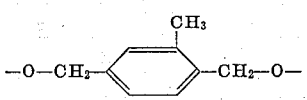

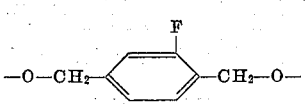

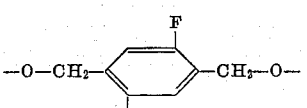

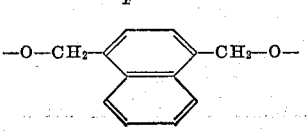

and

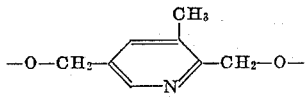

Such peroxide polymers are prepared by copolymerizing oxygen with 2 - methyl-p-quinodimethane, 2 - fluoro-p-quinodimethane, 2,5-difluoro-p-quinodimethane, p-naphthaquinodimethane and 3 - methyl-2,5 - quinopyridyldimethane, respectively.

EXAMPLE 2

This example illustrates the oxidation of poly-p-xylylene peroxide in the presence of the salt of a strong oxidizing acid.

A 200 ml. glass flask fitted with a stirrer and reflux condenser was charged with 4 grams of poly-p-xylylene peroxide produced by the procedure of Example 1 above, 50 cc. of water containing 5 cc. of sulfuric acid and 8 grams of potassium dichromate. The reaction mixture was refluxed at atmospheric pressure for a period of 3 hours during which time a fine crystalline material formed. The crystalline product was separated from the reaction mixture by filtration and was dissolved in a dilute aqueous sodium hydroxide solution. Acidification of this basic solution of product with hydrochloric acid yielded a fine white crystalline product which was identified as essentially pure terephthalic acid by conversion to methyl terephthalate, melting point 140°–141° C. The terephthalic acid was obtained in a 30 percent yield, based on the weight of poly-p-xylylene employed.

EXAMPLE 3

This example further illustrates the oxidation of poly-p-xylylene peroxide in the presence of the salt of a strong oxidizing acid.

A 500 ml. glass flask fitted with a stirrer and reflux condenser was charged with 3.7 grams of poly-p-xylylene peroxide produced by the procedure of Example 1 above, 250 cc. of water containing 24 cc. of concentrated sulfuric acid and 51 grams of sodium chromate. The reaction mixture was refluxed at atmospheric pressure for a period of 17 hours, after which time hydrochloric acid was added. A white crystalline material identified as essentially pure terephthalic acid was obtained in an 82 percent yield.

An almost 100 percent yield of terephthalic acid is obtained when the oxidation of poly-p-xylylene peroxide (5.0 grams, 0.0373 mol) is carried out in about 125 cc. of water containing potassium permanganate (12.8 grams, 0.46 mol) at a temperature of about 100° C. for 16 hours.

EXAMPLE 4

This example illustrates the oxidation of poly-p-xylylene peroxide in the presence of a strong oxidizing acid.

A 200 ml. glass flask fitted with a stirrer and reflux condenser was charged with 5 grams of poly-p-xylylene peroxide produced by the procedure of Example 1 above, 50 cc. of water and 100 cc. of concentrated nitric acid. The reaction mixture was refluxed at atmospheric pressure for a period of 6 hours. This fine precipitate which formed was collected by filtration, washed and dried, and was identified as terephthalic acid, obtained in a 69 percent yield.

EXAMPLE 5

This example illustrates the oxidation of poly-p-xylylene peroxide in the presence of atmospheric oxygen.

To a 1000 ml. glass flask fitted with a reflux condenser there were charged 50 grams of poly-p-xylylene peroxide produced by the procedure of Example 1 above, 500 ml. of water and 40 grams of sodium hydroxide. The reaction mixture was refluxed at 100° C. for a period of 120 hours during which time air was bubbled through the reaction mixture at a rate of about 1 cubic foot per minute. The reaction mixture was then filtered to remove a small amount of solid material. Upon acidification of the clear mother liquid a white crystalline material was obtained which was collected by filtration, thoroughly washed with methanol and dried in vacuo at 60° C. for 24 hours. The product (57.0 grams) was identified as essentially pure terephthalic acid, and was obtained in an almost 100 percent conversion of the poly-p-xylylene peroxide polymer. The fact that terephthalic acid was obtained when the above-mentioned clear mother liquor was acidified indicated the mother liquor to contain sodium terephthalate which was formed directly in the aqueous sodium hydroxide oxidation medium.

The above procedure was repeated except that the reaction time was decreased to 16 hours and 5 grams of sodium cyanide were used as the base instead of the 40 grams of sodium hydroxide. The product (10 grams) was worked-up in the same manner as described in the preceding paragraph and was identified as terephthalic acid.

No terephthalic acid was produced when air was bubbled through 500 ml. of boiling water containing 50 grams of suspended poly-p-xylylene peroxide for a period of 16 hours, nor was any terephthalic acid produced when 500 ml. of water containing 50 grams of poly-p-xylylene peroxide was refluxed at 100° C. for a period of 16 hours in an open reaction flask. In both of these latter reactions the reaction medium was neutral.

EXAMPLE 6

This example illustrates the oxidation of poly-p-xylylene peroxide in the presence of hydrogen peroxide to produce terephthalic acid.

A 500 ml. glass flask, fitted with a reflux condenser and dropping funnel, was charged with 10 grams of poly-p-xylylene peroxide prepared by the procedure of Example 1 above, 0.1 gram of toluene sulfonic acid and 250 ml. of water. The contents of the flask were then heated to 100° C. and boiled for 20 minutes after which time 50 ml. of a 30 percent aqueous solution of hydrogen peroxide was added dropwise to the refluxing mixture over a period of 3 hours. After the addition of the hydrogen peroxide was complete the reaction mixture was refluxed for an additional 15 hours. The precipitate which formed was collected by filtration and dissolved in an aqueous sodium bicarbonate solution. Upon acidification of the basic solution a fine white material formed which was collected by filtration, washed and dried yielding 3.5 grams of product, identified as essentially pure terephthalic acid by conversion to methyl terephthalate, melting point 140° C.–141° C.

When the above reaction and procedure is conducted in a 500 ml. pressure vessel at a temperature of 150° C. under autogenous pressure for a period of 6 hours, about 10 grams of pure terephthalic acid is produced in an almost 100 percent conversion of poly-p-xylylene peroxide to terephthalic acid.

EXAMPLE 7

This example illustrates the oxidation of poly-p-xylylene peroxide in the presence of hydrogen peroxide and methanol to yield methyl terephthalate.

To a 500 ml. glass reaction flask fitted with a reflux condenser there were charged 10 grams of poly-p-xylylene peroxide prepared by the procedure of Example 1 above, 0.1 gram of toluene sulfonic acid and 250 ml. of methanol. After heating the mixture to reflux temperature, 40 ml. of a 30 percent by weight aqueous hydrogen peroxide solution was added. The reaction mixture was then refluxed at a temperature of about 65° C. at atmospheric pressure for a period of 48 hours. After this period, unreacted poly-p-xylylene peroxide (6.0 grams) was removed by filtration. The mother liquor was cooled and evaporated to less than one-half its volume and then was diluted with water until no more precipitate separated. The precipitate was collected and recrystallized from benzene yielding 1.5 grams of methyl terephthalate, melting point, 138° C.

When the above reaction and procedure is repeated in a 300 ml. pressure vessel at a temperature of about 150° C. for a period of about 12 hours, about 12.0 grams of essentially pure methyl terephthalate (melting point 140° C.) is obtained in almost 100 percent selectivity.

EXAMPLE 8

This example illustrates the oxidation of poly-p-xylylene peroxide in the presence of ammonia to yield terephthalamide.

A sealed glass tube containing 5 grams of poly-p-xylylene peroxide prepared by the procedure of Example 1 about, 50 ml. of concentrated ammonia and 10 ml. of a 30 percent hydrogen peroxide solution is heated at 250° C. for 48 hours with continuous agitation. The solid material which forms is collected on a filter and washed with water. The solid is then treated with 25 ml. of boiling methanol. The methanol solution is then concentrated to a volume of 10 ml., cooled and chilled in an ice bath. A precipitate of white crystals forms which is collected and dried in air. The product is identified as essentially pure terephthalamide and is obtained in good yield.

Terephthalamide also is prepared under similar conditions of temperature and time by carrying out the reaction in the presence of ammonia and free oxygen instead of hydrogen peroxide.

Other specific aromatic acids which are produced under the same reaction conditions set forth in Examples 2 to 6 above, following the same general procedures are 2-methyl terephthalic acid, 2-fluoro-terephthalic acid, naphthalene-1,4-dicarboxylic acid and pyridine-2,5-dicarboxylic acid, which acids are obtained by oxidizing the peroxide polymers obtained by copolymerizing oxygen with 2 - methyl - p - quinodimethane, 2 - fluoro - p - quinodimethane, p-naphtha-quinodimethane and p-quinopyridyl-dimethane, respectively. The ester, amides and metal salt derivatives of these acids are similarly prepared as described in the above examples.

As is apparent, the present invention relates to a novel process involving reaction of an oxygen-containing oxidizing agent with a peroxide polymer having a recurring aromatic nucleus and a recurring peroxide linkage. The oxidizing agents or oxygen sources include free oxygen as well as oxygen-containing compounds. The product of the process depends upon the other reagents which may be added to the reaction mixture. For example, the addition of an alcohol to the reaction mixture leads to the direct production of an ester derivative of an aromatic carboxylic acid from the peroxide polymer starting material. The novel process herein described is a particularly good process for the production of terephthalic acid and its derivatives in high yield and selectivity and requires the minimum number of steps to obtain a pure product. Various alterations and modifications of the specific amounts of ingredients and the reaction conditions employed may become apparent to those killed in the art without departing from the scope of the present invention.

We claim:

1. The novel process which comprises reacting an oxygen-containing oxidizing agent at a temperature between about 30° C. and about 250° C. with a peroxide polymer having a recurring aromatic nucleus bonded to a peroxide group through the carbon atom of a methylene group.

2. The process of claim 1 in which said oxidizing agent is free oxygen.

3. The process of claim 1 in which said oxidizing agent is a strong oxidizing acid.

4. The process of claim 1 in which said oxidizing agent is the metal salt of a strong oxidizing acid.

5. The process of claim 1 in which said oxidizing agent is an organic salt of a polyvalent metal, said metal being in one of its higher valence states.

6. The novel process which comprises reacting an oxyen-containing oxidizing agent at a temperature between about 30° C. and about 250° C. in an aqueous medium with a peroxide polymer containing the recurring unit —O—$CH_2$—Q—$CH_2$—O— wherein Q contains at least one six-membered ring having aromatic unsaturation, the remaining nuclear substitution of said Q being selected from at least one of the group consisting of the normally gaseous halogens, hydrogen and methyl radicals.

7. The process of claim 6 in which said Q is a benzene nucleus.

8. The process of claim 6 in which said Q is a naphthalene nucleus.

9. The novel process which comprises reacting an oxygen-containing oxidizing agent at a temperature between about 30° C. and about 250° C. in the presence of an alcohol with a peroxide polymer containing the recurring unit —O—$CH_2$—Q—$CH_2$—O— wherein Q contains at least one six-membered ring having aromatic unsaturation, the remaining nuclear substitution of said Q being selected from at least one of the group consisting of the normally gaseous halogens, hydrogen and methyl radicals to produce an ester derivative of an aromatic carboxylic acid and recovering said ester derivative as the product of the process.

10. The novel process which comprises reacting an oxygen-containing oxidizing agent at a temperature between about 30° C. and about 250° C. in the presence of ammonia with a peroxide polymer containing the recurring unit —O—$CH_2$—Q—$CH_2$—O— wherein Q contains at least one six-membered ring having aromatic unsaturation, the remaining nuclear substitution of said Q being selected from at least one of the group consisting of the normally gaseous halogens, hydrogen and methyl radicals to produce an amide of an aromatic carboxylic acid and recovering said amide as the product of the process.

11. The novel process which comprises reacting an oxygen-containing oxidizing agent at a temperature between about 30° C. and about 250° C. in an alkaline medium containing an alkali metal salt with a peroxide polymer containing the recurring unit $$-O-CH_2-Q-CH_2-O-$$

wherein Q contains at least one six-membered ring having aromatic unsaturation, the remaining nuclear substitution of said Q being selected from at least one of the group consisting of the normally gaseous halogens, hydrogen and methyl radicals to produce a metal salt of an aromatic carboxylic acid and recovering said metal salt as the product of the process.

12. The novel process which comprises oxidation of poly-p-xylylene peroxide in the presence of sodium chromate at a temperature between about 50° C. and about 150° C. to produce terephthalic acid, and recovering said terephthalic acid as the product of the process.

13. The novel process which comprises oxidation of poly-p-xylylene peroxide with nitric acid at a temperature between about 50° C. and about 150° C., to produce terephthalic acid and recovering said terephthalic acid as the product of the process.

14. The novel process which comprises oxidation of poly-p-xylene peroxide with sodium dichromate at a temperature between about 50° C. and about 150° C. to produce terephthalic acid, and recovering said terephthalic acid as the product of the process.

15. The novel process which comprises oxidation of poly-p-xylene peroxide in the presence of free oxygen in an alkaline medium containing an alkali metal salt at a temperature between about 50° C. and about 150° C. to produce a metal salt derivative of terephthalic acid, and recovering said terephthalic acid as the product of the process.

16. The novel process which comprises reacting poly-p-xylylene peroxide at a temperature between about 30° C. and about 250° C. with an oxygen-containing oxidizing agent in the presence of methanol to produce methyl terephthalate, and recovering said methyl terephthalate as the product of the process.

17. The novel process which comprises reacting poly-p-xylylene peroxide at a temperature between about 30° and about 250° C. with an oxygen-containing oxidizing agent in the presence of ammonia to produce terephthalamide, and recovering said terephthalamide as the product of the process.

18. The process of claim 1 in which said oxidizing agent is hydrogen peroxide.

19. The process of claim 9 in which said oxidizing agent is hydrogen peroxide.

20. The novel process which comprises oxidation of poly-p-xylylene peroxide in the presence of hydrogen peroxide at a temperature between 50° C. and 150° C. to produce terephthalic acid as the product of the process.

References Cited in the file of this patent

UNITED STATES PATENTS

| | | |
|---|---|---|
| 2,601,223 | Roedel | June 24, 1952 |
| 2,653,165 | Levine | Sept. 22, 1953 |
| 2,767,208 | Miller et al. | Oct. 16, 1956 |

OTHER REFERENCES

Wagner et al.: "Synthetic Organic Chemistry," p. 419, J. Wiley, 1953.

UNITED STATES PATENT OFFICE
Certificate of Correction

Patent No. 2,864,855                                                            December 16, 1958

Stafford L. Hopwood, Jr., et al.

It is hereby certified that error appears in the printed specification of the above numbered patent requiring correction and that the said Letters Patent should read as corrected below.

Column 3, line 37, the formula should appear as shown below instead of as in the patent:

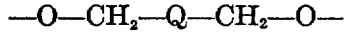

line 39, for "6:7" read —6:1—; column 5, line 60, for "one-half and" read —one-half hour and—; column 13, line 17, for "about" read —above—; line 60, for "killed" read —skilled—.

Signed and sealed this 28th day of April 1959.

[SEAL]

Attest:
T. B. MORROW,
*Attesting Officer.*

ROBERT C. WATSON,
*Commissioner of Patents.*